J. NOVAK.
VARIABLE TRANSMISSION GEARING.
APPLICATION FILED FEB. 23, 1910.
1,036,690.
Patented Aug. 27, 1912.
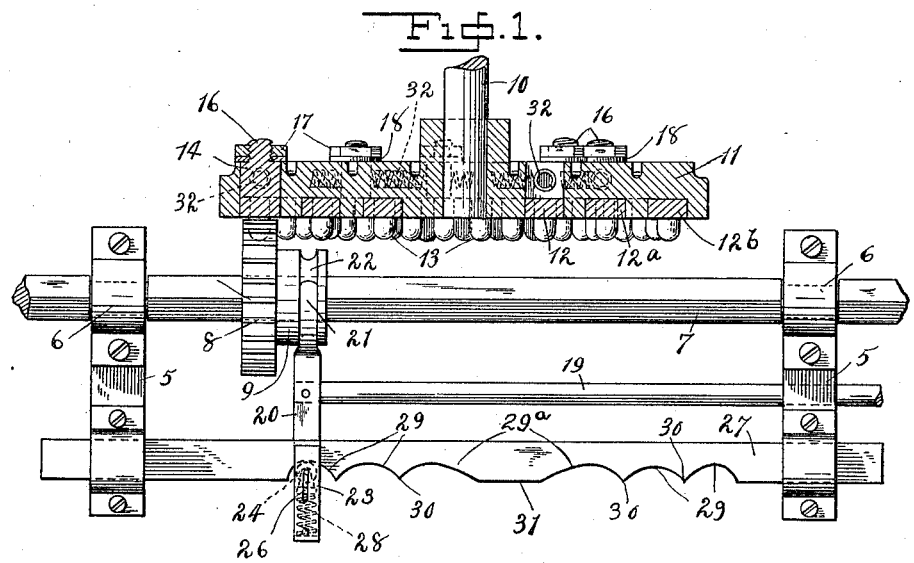
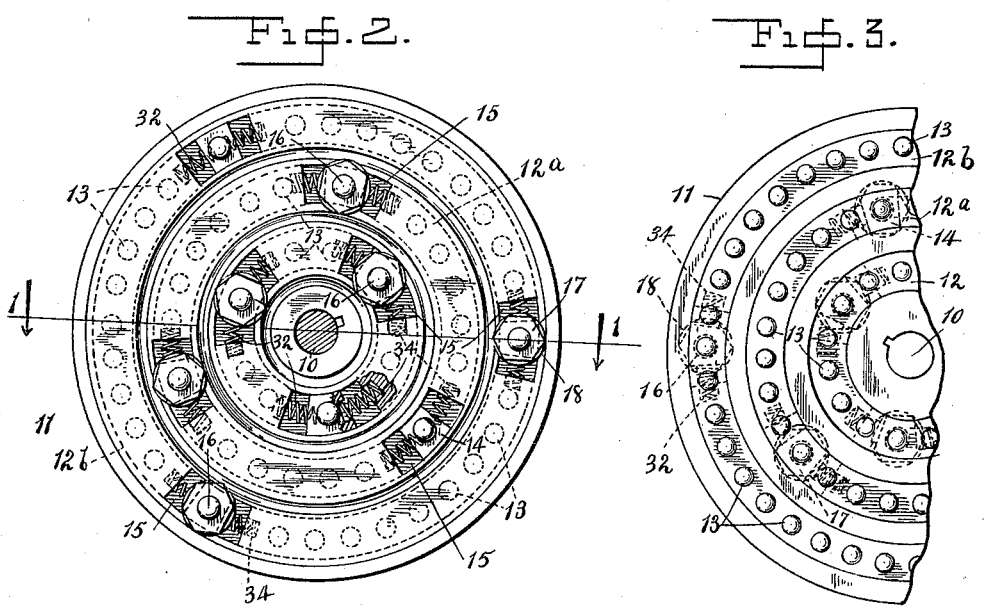
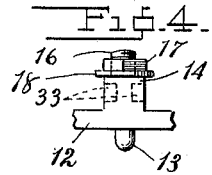
WITNESSES:
CH. J. Marty
M. A. Milord
INVENTOR
James Novak
By Frederick Benjamin
Atty.

UNITED STATES PATENT OFFICE.

JAMES NOVAK, OF CHICAGO, ILLINOIS.

VARIABLE TRANSMISSION-GEARING.

1,036,690.  Specification of Letters Patent.  Patented Aug. 27, 1912.

Application filed February 23, 1910. Serial No. 545,302.

*To all whom it may concern:*

Be it known that I, JAMES NOVAK, citizen of the United States, residing at Chicago, in the county of Cook and State of Illinois, have invented certain new and useful Improvements in Variable Transmission-Gearing, of which the following is a specification.

My invention relates to variable speed transmission devices and refers particularly to gearing of this class especially adapted to be used in motor driven vehicles.

The chief objects of the improvements which constitute the subject matter of this application for patent are:—to provide a mechanism for the purpose stated that will be simple in construction and effective in operation, and to furnish means whereby a large portion of the shock of the impact between the teeth when the gears are shifted will be absorbed, and the speed changed without throwing off the power generator connection.

Another object of this invention is to provide means for automatically throwing the shifted gear into mesh with the driver in case the said gear is left out of mesh, this feature permitting the shifting mechanism to be operated manually or automatically as may be desired.

A further object is to provide a mechanism so arranged that the same movement which varies the speed may be used to reverse the driven gear or shaft.

I accomplish the desired results by means of the device illustrated in the accompanying drawing which forms a part of this application, the important details of construction being disclosed in the following views.

Figure 1 is a side elevation of my improved variable speed transmission device with the driving gear in section, the line 1—1 of Fig. 2 showing the position of the cutting plane; Fig. 2 is a top plan view of the driving gear; Fig. 3 is a fragmentary view showing the under face of a portion of the driving gear, and Fig. 4 is a fragmentary view showing one of the shock absorbing devices.

Referring to the details of the drawing, the reference numeral 5 indicates suitable supporting members, adapted to be attached to the frame of the vehicle, or other contrivance for which the transmission mechanism is designed. Upon these members are mounted boxes 6 in which is journaled a shaft 7, which carries a pinion 8 provided with a hub 9. This pinion is slidably mounted on said shaft and to insure the rotation of the pinion with its shaft the latter is squared throughout that portion of its length upon which the pinion slides, and the hole in the pinion correspondingly shaped. Arranged with its axis intersecting the shaft 7 is a drive shaft 10, carrying upon its extreme end a disk gear having teeth arranged in a plurality of concentric circles and adapted to mesh with the pinion 8. This disk gear constitutes an important feature of my invention and its construction will now be described in detail. The body 11 is of disk form firmly keyed to the said shaft 10 and upon the front face of the said body are formed a plurality of concentric channels or grooves in which are arranged flat gear rings 12, $12^a$, $12^b$, adapted to slide circumferentially. These rings carry gear teeth 13, preferably round or cylindrical in cross section as shown, although they may be oval or of other shapes if desired.

The said teeth are firmly fixed in their respective rings at spaced intervals corresponding to the pitch of the gear. The said rings are retained in their seats or grooves in the following manner.

Attached to the back of each gear ring are lugs or blocks 14 preferably arranged 120 degrees apart, the bottoms of the channels being furnished with slots or openings 15 to receive them. The said slots extend through the body 11 of the gear, and are longer than the width of the said lugs or blocks so that the latter will have a limited lateral movement when the ring is rotatably slid. Each of said blocks is provided with a reduced portion 16 which is threaded to receive a nut 17, a washer 18 being placed beneath said nut, the washer having a diameter greater than the width of the slot 15, so that its margins will engage the rear face of the gear disk and hold the ring in position, the pressure being so adjusted as to allow the sliding movement of the ring hereinafter described.

In Fig. 1 the slidable pinion 8 is shown in engagement with the teeth of the outer gear ring $12^b$, but it will be evident that the said pinion may be brought into mesh successively with each of the said rings by sliding it on its shaft across the face of the disk gear. The pinion is reciprocated in this manner by a shifting rod 19, which slides in a suitable hole in the frame piece 5 and is rigidly attached at the end to the middle portion of a flat bar or cross arm 20, provided at one end with a fork 21 adapted to engage a peripheral groove 22 in the hub of the pinion 8. The opposite end of said cross arm is bent upon itself and returns parallel with the main portion forming a housing 23 in which is mounted an antifriction roller 24, the axle of the roller projecting at each end through slots 26 in the sides of the housing. Extending between the supporting members 5, parallel with the pinion shaft 7, is a flat guide bar 27, which passes through the housing 23. The roller 24 is yieldingly held in engagement with the margin of said bar by a suitable spring 28, and the said margin is provided with a series of concave indentations 29, 29ª, which are spaced to correspond with the position of the roller 24 when the pinion 8 is in mesh with one of the gear rings 12, 12ª, 12ᵇ. The curves forming the indentations or depressions 29 meet to form acute angles or teeth 30 which correspond with the position of the roller 24, when the pinion is between the said rings, and consequently said pinion is never free from the teeth 13. It will be noted that there are two series of the angles or teeth 30 and the interdental depressions 29 arranged upon opposite sides of an intact portion 31 of the guide margin, said portion corresponding with the position of the roller 24 when the pinion 8 is opposite the center of the disk gear.

For the purpose of lessening the jar which would be imparted to the mechanism when the pinion is shifted from one ring to engage the teeth of another I provide shock absorbing devices for the gear rings 13. Upon opposite sides of each block or lug 14 are arranged spiral springs 32, the ends of said springs engaging sockets 33, 34, formed in the block 14 and disk 11, respectively. These springs are approximately of equal tension and sufficiently strong to hold the lug or block 14 intermediate the ends of the slots or openings 15, until the corresponding ring is in mesh with the pinion or during the change or shift of the pinion from one ring to another.

The operation of the device is as follows:—When the pinion is in mesh with the outer gear ring 12ᵇ, as shown in Fig. 1, to reduce the speed of the shaft 7 the pinion 8 will be moved by means of the rod 19 toward the center of the disk 11 until it engages the teeth of the middle rings 12ª. As the pinion 8 moves away from the ring with which it is engaged the roller 24 will ride upon the tooth or angle 30 corresponding to its position, and if the action of the shifting rod should cease at this point, the pinion will be automatically thrown into gear with one of the adjacent rings, since the sharpness of the angle 30 will prevent the roller from lodging upon its apex, and the force of the spring 28 will throw the pinion to one side or the other according to the relation of the roller axis to the center line. In order to reverse the rotary movement of the driven shaft, the pinion is shifted to the opposite side of the disk gear center, where it will become engaged with the gear teeth moving in the opposite direction, the action of the teeth 30 in coöperation with the roller 24 being the same as before. When it is desired to throw the pinion 8 entirely out of gear it is moved to a position opposite the center of the disk 11, and when at this point the roller 24 will engage the flat portion 31 of the guide bar 27, and consequently cannot be acted upon by the spring 28 until moved into contact with the indented portion.

Having thus described my invention, what I claim as new, is:—

1. In mechanism for the purpose specified, the combination of a rotatable disk, a plurality of concentric teeth-bearing rings yieldingly mounted upon said disk, a pinion adapted to engage the said rings successively, means for shifting the pinion and means for automatically throwing the said pinion into gear with an adjacent ring.

2. In mechanism for the purpose specified, the combination of a rotatable disk provided with a series of concentric grooves, teeth bearing rings movably mounted in said grooves, means for removably retaining said rings, springs engaging the rings, a pinion arranged to slide transversely to said disk and adapted to engage the teeth of selected rings, means for shifting said pinion and means for automatically throwing the said pinion into gear with an adjacent ring, when released from the shifting means.

3. In mechanism for the purpose specified, the combination of a disk rotatably mounted, having a plurality of concentric grooves in one face thereof, teeth bearing rings movable in said grooves, means for removably retaining said rings, springs yieldingly holding said rings against movement in either direction, a shaft arranged transversely adjacent said disk, a pinion slidably mounted on said shaft, and adapted to engage said rings successively, means for shifting said pinion said shifting means comprising an arm engaging said pinion, a guide bar provided with teeth, and a roller yieldingly mounted on said arm and adapted to engage said bar.

4. In mechanism for the purpose specified, a variable speed gearing comprising a disk, a series of concentric rings movably mounted on said disk, having gear teeth thereon, and means for yieldingly holding said rings in their initial positions.

5. In mechanism for the purpose specified, a variable speed gearing comprising a disk having concentric grooves in its face, a shaft for the disk, gear rings slidably mounted in said grooves, and having threaded lugs thereon engaging openings in the disk, nuts on said lugs engaging said disk, and springs interposed between said lugs and the adjacent portions of the disk.

6. In mechanism for the purpose specified, a variable speed gearing having a plurality of series of teeth arranged concentrically, a pinion adapted to be shifted into engagement with selected series of teeth, and means for shifting said pinion, said means comprising an arm engaging the pinion, a guide bar for said arm, having serrations thereon, and a roller yieldingly mounted on said arm and adapted to engage said serrations.

7. In mechanism for the purpose specified, a variable speed gearing having a plurality of movable teeth bearing gear rings arranged concentrically, means for yieldingly holding said rings in their initial positions, a shaft arranged transversely to said gear, a pinion slidably mounted on said shaft, and adapted to be alternately shifted into engagement with selected rings upon opposite sides of the center of said gear, and means for automatically throwing the pinion into engagement with one of the adjacent gear rings when released from the shifting means at a point between two of said rings.

8. In mechanism for the purpose specified, a gear disk, a plurality of movable gear rings concentrically mounted on said disk, springs adapted to yieldingly hold said rings against movement in opposite directions, a pinion adapted to be alternately shifted into engagement with selected rings upon opposite sides of the center of said gear disk, and means for forcing said pinion into mesh with said disk when released at a point between two of said gear rings.

9. In mechanism for the purpose stated, a gear disk, having a plurality of concentric grooves in the face thereof, gear rings yieldingly mounted in said grooves, and a pinion adapted to be moved into engagement with a selected gear ring upon either side of the center of said disk.

10. In mechanism for the purpose stated, a shaft, a member on said shaft having a plurality of concentric grooves in the face thereof, gear rings yieldingly mounted in said grooves, a pinion adapted to be moved into engagement with a selected gear ring upon either side of the center of said member, and means for automatically shifting said pinion into engagement with said member when released at a point between two adjacent gear-rings.

11. In a gearing a rotatable member, a plurality of series of teeth arranged in concentric circles and in different radial planes, means whereby the teeth of each series may have a limited movement in the plane of the rotation of the series and adjustable means for operatively engaging said teeth.

12. In a gearing, a shaft, a toothed member fixed on the shaft, a second toothed member concentric with the first member and of different diameter, means yieldingly connecting said members and means for limiting the movement of said second member on its axis.

13. In a gearing, a base member, toothed bearing members arranged on the base member, the teeth of which project at right angles to the base member and means for yieldingly connecting said toothed bearing members with said base member.

14. In a gearing, a base member, teeth yieldingly and removably mounted on said base member, a gear adapted to intermesh with said teeth and means for manually and automatically moving said gear into operative relation with said teeth.

In testimony whereof I affix my signature in the presence of two witnesses.

JAMES NOVAK.

Witnesses:
F. BENJAMIN,
M. A. MILORD.

---

Copies of this patent may be obtained for five cents each, by addressing the "Commissioner of Patents, Washington, D. C."